(12) United States Patent
Krause (10) Patent No.: US 12,271,753 B1
(45) Date of Patent: Apr. 8, 2025

(54) SCHEDULING SYSTEM AND METHOD FOR PRECISE AUTOMATED CONSTRUCTION

(71) Applicant: Richard A. Krause, Arlington Heights, IL (US)

(72) Inventor: Richard A. Krause, Arlington Heights, IL (US)

(*) Notice: Subject to any disclaimer, the term of this patent is extended or adjusted under 35 U.S.C. 154(b) by 685 days.

(21) Appl. No.: 17/533,992

(22) Filed: Nov. 23, 2021

Related U.S. Application Data (63) Continuation-in-part of application No. 17/517,191, filed on Nov. 2, 2021, and a continuation-in-part of application No. 17/508,277, filed on Oct. 22, 2021, now Pat. No. 12,118,631, and a continuation-in-part of application No. 17/492,246, filed on Oct. 1, 2021, and a continuation-in-part of application No. 17/133,714, filed on Dec. 24, 2020, now Pat. No. 11,321,791.

(60) Provisional application No. 63/117,040, filed on Nov. 23, 2020.

(51) Int. Cl.
*G06F 9/48* (2006.01)
*G06F 8/65* (2018.01)
*G06F 8/77* (2018.01)

(52) U.S. Cl.
CPC ............ *G06F 9/4881* (2013.01); *G06F 8/65* (2013.01); *G06F 8/77* (2013.01)

(58) Field of Classification Search
CPC .......... G06F 9/4881; G06F 8/65; G06F 8/77; G06Q 10/087
USPC .......................................................... 705/5
See application file for complete search history.

(56) References Cited

U.S. PATENT DOCUMENTS 11,270,256 B2 * 3/2022 Zhou .................... G06Q 10/087
2006/0015475 A1 * 1/2006 Birkner ................. G06Q 50/08

* cited by examiner

*Primary Examiner* — Ariel J Yu
*Assistant Examiner* — Denisse Y Ortiz Roman
(74) *Attorney, Agent, or Firm* — Christopher J. Scott

(57) ABSTRACT

The AutoBuild schedule system/module gathers project design data information and basic schedule constraint goal information and separates and categorizes all parts and pieces from large pieces of equipment and assembly systems to the smallest connection materials such as closure trim, screws, nails, adhesives etc. From a basic construction logic, the AutoBuild schedule system/module assembles the initial schedule for the project. This initial schedule is then reevaluated by its internal system taking into several factors, including (1) an initial review and resequencing from a human professional; (2) information received from vendors bidding the project; and (3) input giving further accurate details of quantities required, actual production and delivery dates, weather, and/or other environmental factors, etc. The AutoBuild schedule system/module then tracks the actual project progress utilizing information and status of contractual commitments, procurement approvals, fabrication, and delivery.

22 Claims, 1 Drawing Sheet

AutoBuild Scheduling

SCHEDULING SYSTEM AND METHOD FOR PRECISE AUTOMATED CONSTRUCTION

PRIOR HISTORY

This application claims the benefit of U.S. Provisional Patent Application No. 63/117,040 filed in the United States Patent and Trademark Office (USPTO) on 23 Nov. 2020; is a Continuation-in-Part application of pending U.S. patent application Ser. No. 17/133,714 filed in the USPTO on 24 Dec. 2020; is a Continuation-in-Part application of pending U.S. patent application Ser. No. 17/492,246 filed in the USPTO on 1 Oct. 2021; is a Continuation-in-Part application of pending U.S. patent application Ser. No. 17/508,277 filed in the USPTO on 22 Oct. 2021; and is a Continuation-in-Part application of pending U.S. patent application Ser. No. 17/517,191, the specifications and drawings of which applications are hereby incorporated by reference thereto.

FIELD OF THE INVENTION

These specifications generally relate to a system for managing a construction project, and more particularly to a software application or software module-based system that automates the development, tracking, and updating of scheduling aspects of the construction project.

BRIEF DESCRIPTION OF THE PRIOR ART

US Patent Application Publication No. 2020/0151937, authored by Miller (937 Publication), discloses a Method and System for Construction Project Management Using Photo Imaging Measurements. The '937 Publication describes harnesses the use of photo imaging and measurement capture for use by do-it-yourselfers, handymen and small contractors. The method and system operates on mobile computing devices and includes an image recognition system. By performing various imaging-based measurements and then processing the resultant data, the method and system produces bills of materials. invoices, and receipts for the necessary tools and materials required by the construction project.

US Patent Application Publication No. 2020/0027043, authored by Agassi, et al. ('043 Publication), discloses a Construction Project Management System and Method Thereof. The '043 Publication describes a management system including processing circuitry and a memory, the memory containing instructions that, when executed by the processing circuitry, configure the system to: analyze a project data of a construction; based on the analysis of the project data, derive metadata associated with the construction project, wherein the metadata designates at least various stages associated with the construction project, and a completion threshold for each stage; and based on the metadata, generate an interface for allowing at least two end-user devices to collaboratively interact with the interface, wherein the interface provides interactive visual features indicative of a progress of each of the stages associated with the construction project.

US Patent Application Publication No. 2019/0003153, authored by Shike, et al. ('153 Publication), discloses a Construction Management System, Construction Management Method, and Management Device. The '153 Publication describes a management system including an object detecting unit mounted on a work machine and configured to detect an object in a construction site and output information on the object; a shape detecting unit configured to output shape information indicating a three-dimensional shape of the object by using the information on the object detected by the object detecting unit; an information attaching unit configured to attach, to the shape information, time information indicating a time when the object is detected; and a management device configured to generate current state information on the construction site on the basis of the shape information to which a latest piece of the time information is attached.

US Patent Application Publication No. 2019/0026843, authored by Kim ('843 Publication), discloses a Method for Integrated Management Including Building Construction and Maintenance Based on Video. The '843 Publication describes a video-based integrated building construction and maintenance management method in which a series of processes of building construction and maintenance after build completion is produced as a video and registered in a building management server. The video is configured to be checked by a building owner or resident so that a building can be transparently managed by fundamentally preventing faulty construction that may occur during a construction step and untrustworthy maintenance.

US Patent Application Publication No. 2018/0332102, authored by Sheidaei ('102 Publication), discloses a Cloud-Based System for Collaborating Engineering, Operations, Maintenance, Project Management, Procurement, and Vendor Data and Activities. The '102 Publication describes certain systems and methods operable via a cloud platform utilizing Artificial Intelligence (AI). The system is configured to connect with a computerized application to store and manage data and activities of one or more departments.

The system enables vendors to access the data of one more departments to perform vendor activities such as generating quote documents. The system is further configured to provide a bid evaluation including a list of one or more vendor comprising products matching the requirements of the one or more departments. The system further enables personnel of one or more departments to select at least one vendor for placing orders and enables the selected vendor to submit data required by the personnel of one or more departments to collaborate data or for procurement.

US Patent Application Publication No. 2018/032225, authored by Schwartz ('225 Publication), discloses a System for On-Site Tracking, Managing, Planning and Staging Construction Projects. The '225 Publication describes a construction management system for allowing a user to capture an item identifier from an item (e.g., shipment, group of components, and/or one or more components) using a mobile device. The item identifier may be used to identify a project and access a model for the product, identify a component in a model, and/or identify the components in a shipment for staging purposes.

Moreover, the system may be used to identify a status for the one or more components. The status may be that the one or more components are shipped, received, staged for assembly, installed, or the like. The status of the one or more components may be automatically updated by capturing the item identifier. Moreover, the user may also select shipment information for past, current, and/or future shipments in order to identify the one or more components associated with each of the shipments.

US Patent Application Publication No. 2018/0209156, authored by Pettersson ('156 Publication), discloses a Construction Management System and Method. The '156 Publication describes a construction management system for constructing a building including at least one heavy lifting machine for moving a one building element to a mounting position on the building, a central computing unit providing a building information model comprising at least a construction plan comprising a target state of the building construction, a three-dimensional model of an actual construction state of the building, and a three-dimensional model of the element, wherein the central computing unit is adapted to determine the mounting position for the element based on the construction plan, the model of the current construction state and on the model of the element.

US Patent Application Publication No. 2018/0174250, authored by Faulkner ('250 Publication), discloses certain Construction Project Management Systems and Methods. The '250 Publication describes an operation including the steps of generating a project profile for a construction project, determining project details of the project, determining a regulatory process to be performed during the project based on the project details and regulatory rules, determining worker's certificates or licenses corresponding to the regulatory process and the project details, determining candidate workers for the construction project from registered workers, and causing a first GUI for selection of one or more candidate workers to be generated. The first GUI includes indicators of statuses of the worker's certificates or licenses corresponding to the regulatory process with respect to each of the one or more candidate workers.

US Patent Application Publication No. 2017/0278037, authored by Pettersson ('037 Publication), describes a Construction Management System and Method for Linking Data to a Building Information Model. The '037 Publication describes a construction management system comprising a plurality of sensor means adapted to detect events at a building site of the structure, a central computing unit providing a three-dimensional model of the building site, and at least one displaying device that is adapted to display the three-dimensional model to a user. The sensor means are adapted to generate data comprising information about a detected event.

The system further comprises communication units adapted to transmit a message comprising the data and a location information to the central computing unit, assign coordinates in the three-dimensional model according to the location information, evaluate options for reacting on the event by analyzing the data, assign evaluated options to the data, and display a note which is related to evaluated options to the user in real-time at the assigned coordinates in the three-dimensional model.

U.S. Pat. No. 10,831,944 ('944 Patent), issued to Giattina, discloses a System and Method to Facilitate the Design, Manufacturing and Construction of Structures. The '944 Patent describes a system that facilitates the building of a structure according to a project architectural design plan. The system provides standardized information to participants associated with a project based on the project design plan. The project architectural design plan can be compliant with one or more standards stored by the system. The project design plan can also incorporate information regarding products that are utilized in the project such as a plurality of prefabricated building modules. The requirements for a product are dictated by the standards established for the product and the project. Information about products used in the project can be embedded in links of the project architectural design plan.

U.S. Pat. No. 10,593,104 ('104 Patent), issued to Robert, et al., discloses certain Systems and Methods for Generating Time Discreet 3D Scenes. The '104 Patent describes certain methods, systems, and apparatus including medium-encoded computer program products for generating and visualizing 3D scenes of a build-site. The invention may be said to include, in one aspect, a method including: obtaining site data acquired by one or more capture devices, wherein the site data comprises data sets corresponding to two or more locations about a physical site, and each respective data set comprises (i) imaging data of the physical site, (ii) coordinate data for the imaging data, and (iii) time metadata for the imaging data. The methodology further reconstructs and outputs a series of three dimensional (3D) modeled scenes of the physical site from the site data using the imaging data, the coordinate data, and the time metadata Generally considering the state of the art exemplified by the patent publications briefly described above, the reader will bear in mind certain shortcomings in the construction industry at least insofar as its relatively low-level digitalization is concerned. In other words, the reader will note from a consideration of the foregoing that the state of construction industry art perceives a need for a digitalized comprehensive construction project management system that receives design component data from an outside design provider, converts the design component date into a format for use by a plurality of interconnected system-supportive, software-based module components to advance the initial design component data from design concept to final build all within a system of full or near-full automation. What follows is a summary of a non-transitory, computer-implementable software-based application or module component supportive of a comprehensive construction project management system otherwise described more fully in U.S. patent application Ser. No. 17/133,714 ('714 Application), from which this application claims a benefit and builds thereupon.

System Background and Summary

In the world's pursuit to automate construction there is a need to develop a more comprehensive and interactive project scheduling system that goes beyond what exists in the market today. A project estimating system is needed that can initially take information provided from the electronic design along with basic schedule constraint information fed into it then read and decipher it down to the smallest details from large components and equipment to the smallest connection materials such as closure trim, screws, nails, adhesives, etc. In a short amount of time (e.g. days or hours) and in an AI, automated manner, provide a comprehensive, detailed, and interactive project schedule that can be adjusted, used for contractual requirements, tracked, and updated whether the project is built with human labor or by robot, drone, or other automation methods.

Because of the ability of this system to evaluate the actual physical progress along with the status of subsequent successor delivery and assembly activities the AUTOBUILD module-based Schedule System projects the final completion date of the project with a high level of accuracy. Throughout the process, the AUTOBUILD SCHEDULE system/module sends out warnings and/or alerts when an activity is at risk of running behind/ahead or if an activity is in fact behind/ahead in order for possible corrective action to take place. This is what the AUTOBUILD SCHEDULE system or module according to the present invention essentially provides.

AutoBuild Schedule Module

Initially, the AUTOBUILD SCHEDULE system/module gathers the project design data information and basic schedule constraint goal information as input therein. It then takes this information and separates and categorizes all parts and pieces from large pieces of equipment and assembly systems to the smallest connection materials such as closure trim, screws, nails, adhesives etc. The module utilizes historic data, basic logic, learned adjustments, bar coding and other identification methods to perform this function.

From a basic construction logic, built from years of standard assembly sequence in the industry, the AUTOBUILD SCHEDULE system/module assembles the initial schedule for the project. This initial schedule is then reevaluated by its internal system taking into several factors, including (1) an initial review and resequencing from a human professional; (2) information received from vendors bidding the project; and (3) input giving further accurate details of quantities required, actual production and delivery dates, weather, and/or other environmental factors, etc.

The AUTOBUILD SCHEDULE system/module then tracks the actual design project progress utilizing information and status of contractual commitments, procurement approvals, fabrication, and delivery. The tracking of the mentioned items is generally performed through electronic communications and may be completed by a human paperwork process as loaded into the system. For the most part, tracking of the actual project assembly is performed through the same communication process. However, it is contemplated that additional tracking features may be performed with drone photography and GPS type systems.

This tracking process allows a comparison of actual real-time status of the project completion to the schedule previously projected and calculated. This process (Updating Process) is in constant cycle to keep the current projected project completion date as accurate as possible. During this process, for example, a progress of fabricating a component like structural steel that can take several weeks or months is tracked in actual real-time and if the fabrication is ahead of or behind schedule, the overall schedule is adjusted.

A further example is illustrated by tracking iterative quantities of masonry units for an exterior building as they are put into place as compared to the total required quantities of the masonry units required to complete the project. These types of information are utilized to calculate the percent completion of items and are used in the updating process. During this Updating Process, the AUTOBUILD SCHEDULE system/module sends out warnings and/or alerts to the appropriate parties and parts of the system when an activity is at risk of running behind/ahead or if an activity is in fact behind/ahead in order for possible corrective action to take place.

The AUTOBUILD Scheduling System according to the present invention operates in ways that are beyond any existing in the market currently. For example, the AUTOBUILD Scheduling System according to the present invention automatically updates in real time as progress progresses, and comprises built-in "Master Builder" intelligence to make audible/adlib changes that in today's world only a highly skilled and experienced "Master Builder" could do. In our present time and within the new generations, this particular human being is becoming almost nonexistent. Whereas other construction scheduling systems in the market are passive systems and rely on other factors to drive them, the AUTOBUILD Scheduling System is proactive in that it comprises built-in brains of a "Master Builder" so it can direct and provide the optimal path of construction assembly solutions. This saves time and money on a project in ways that are beyond the capability of a normal human being in the construction industry.

BRIEF DESCRIPTIONS OF THE DRAWINGS

Other features and objectives of the present invention will become more evident from a consideration of the following brief description of the patent drawing submitted in support of these specifications.

DETAILED DESCRIPTION OF THE PREFERRED EMBODIMENT

A software program may comprise numerous modules as separate executable files that form parts of a whole program. A module is a software component or part of a program that contains one or more routines. One or more independently developed modules make up a program. An enterprise-level software application may contain several different modules, and each module serves unique and separate business operations. Given the complexity of the overall operating system, the author has selected the term module to describe the software module components that together cooperate to provide or support the Comprehensive Construction Project Management System of U.S. patent application Ser. No. 17/133,714 ('714 Application) from which this application claims a benefit and is a Continuation-in-Part Application.

Figure 1:
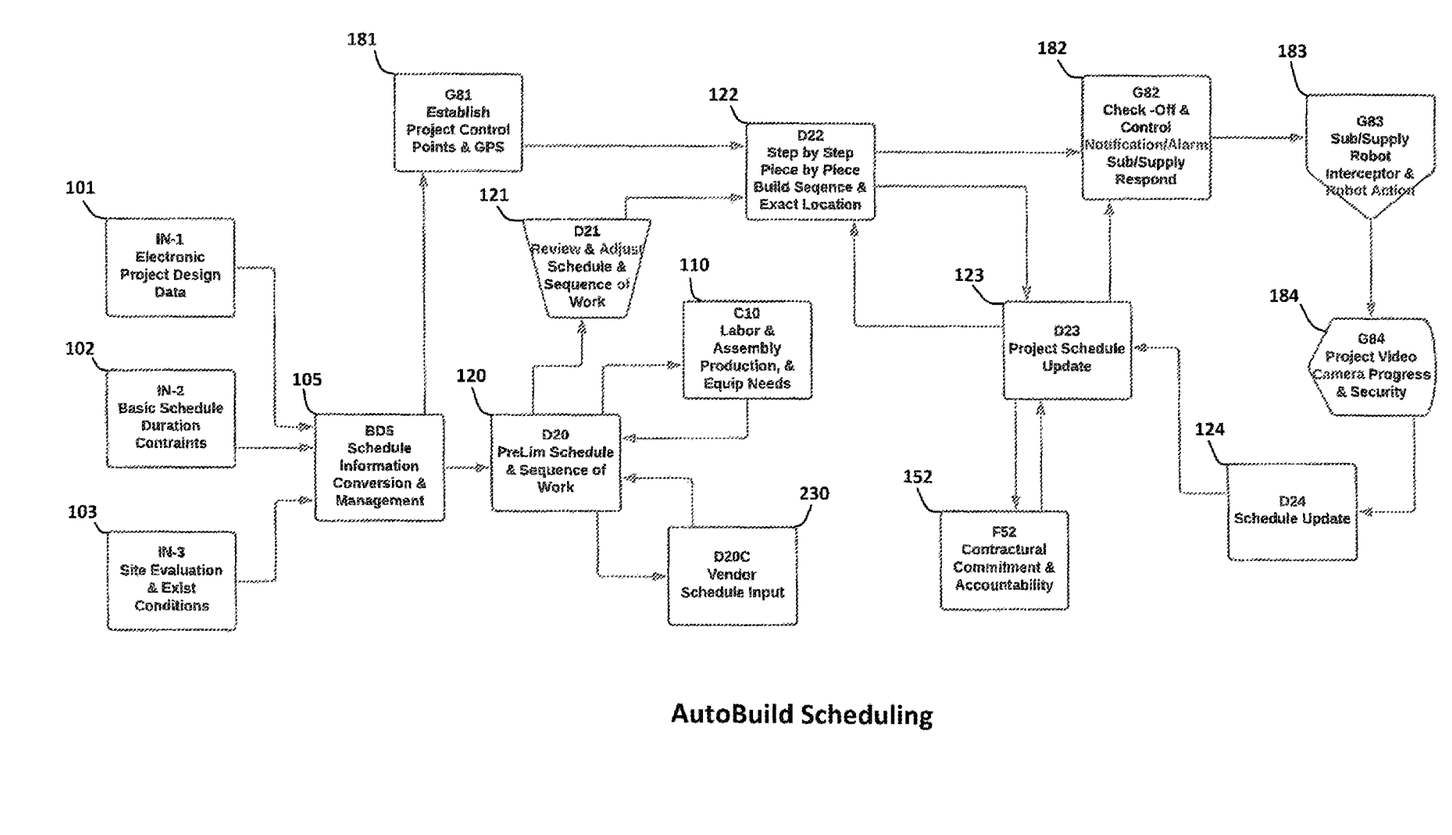
FIG. 1 is a flowchart diagram depicting a centralized or hub-like Schedule Information, Conversion and Management software module component in downflow communication from a series of Project Design, Basic Schedule Constraints, and Existing Conditions of Site software module components with a series of branching software module components or nodes in downflow communication from the Schedule Information, Conversion and Management software module component.

The BD5 Schedule Information Conversion & Management software module component or Node (105) accumulates the information inputted into it as it relates to project design data (101), desired project duration constraints (102), and the site evaluation & existing conditions (103). The input collectively embraced by the project design data node (101), desired project duration constraints node (102), and site evaluation & existing conditions node (103) are developed and available in the market as separate information bundles and thus separate from the AUTOBUILD Schedule system/module according to the present invention, but are necessarily fed into the AUTOBUILD Schedule system/module for proper functioning. The BD5 Node (105), with its intelligence, recognizes and extracts the specific information it needs to carry out its purpose.

For instance, the BD5 Node (105) deciphers information such as material, fabrication activities, delivery requirements, equipment, labor, assembly constraints, etc. that is needed to assemble a fully comprehensive schedule for the project. While extracting this information the BD5 Schedule Information Conversion & Management Node (105) accumulates quantities of such items as utilized downstream to determine how long each part of the assembly will take to be completed. The BD5 Node (105) then converts and organizes the information received in a manner that can be sent downstream to the D20 Preliminary Schedule and Sequence of Work Node (120), and the G81 Establish Project Control Points and GPS Node (181). These two nodes just mentioned start two separate processes that eventually come together at the D22 Node (122) described in more detail later below.

The D20 Preliminary Schedule and Sequence of Work Node (120) receives information sent thereto from the BD5 Node (105), and starts the process of laying out a template for all elements of the project, placing them into a preliminary sequence that can then be reviewed and adjusted by other nodes downstream that need a basic layout of sequence in order to provide input to make adjustments needed to optimize accuracy of the schedule. In other words, the downstream nodes critically review information from upstream and make adjustments as needed based on relevant facts and a basic template as developed by the D20 Node (120). The D20 Node (120) is initially programed with a basic understanding of construction sequences for a variety of different projects referenced from the author's past 30 years of history and knowledge of proper and successful construction assembly sequences, along with other standard processes that are used in the industry.

The D20 Node (120) then takes the relevant information needed (e.g. materials, fabrication activities, delivery requirements, equipment, labor, assembly constraints, etc.) to assemble a fully comprehensive schedule for the project and places them in order with initial durations, based on its built-in history of productions. This first process we shall call the "Initial Schedule Template" and resides with in the D20 Node (120). This Initial Schedule Template is then sent downstream to the C10 Labor & Assembly Production & Equipment Needs Node (110) and the D20C Vendor Schedule Input Node (230) for evaluation.

When receiving input from the C10 Node (110) and the D20C Node (230), the D20 Node (120) makes adjustments from the relatively more educated and detailed specific C10/D20C Nodes (110/230) to optimize the accuracy of the preliminary schedule and sequence of work at that point of the process. It should be noted that the D20 Preliminary Schedule and Sequence of Work Node (120) identifies any discrepancies from the information it is receiving from the C10 and D20C Nodes (110/230) and manages those discrepancies to make the most accurate preliminary schedule as it relates to the then current market conditions. Once the foregoing process is complete, the D20 Preliminary Schedule and Sequence of Work Node (120) sends the information downstream to the D21 Review & Adjust Schedule and Sequence of Work Node (121) for the next level of scrutiny prior to the schedule being used and injected into the process in which the actual assembly/construction of the project starts to take place.

The C10 Labor & Assembly Production & Equipment Needs Node (110) is in bidirectional downflow/upflow communication with the D20 Preliminary Schedule and Sequence of Work Node (120). The C10 or Labor & Assembly Production & Equipment Needs Node (110) identifies all items in the D20 Node (120) that require labor, permanent and temporary materials and equipment to assemble parts of the project. The C10 Node (110) thus calculates, with standard production rates (configured to improve in an artificial intelligence manner through or over time), the durations for each of the elements being implemented in the construction project in conjunction with the quantities it has been provided.

The C10 Node (110) also considers the level of difficulty or ease with which the proposed production may be carried out and makes final adjustments to that production. In this regard, it is contemplated that manual labor is becoming increasingly replaced by automated means. Accordingly, construction projects are becoming increasingly automated. The AUTOBUILD SCHEDULE system/module according to the present invention is designed to embrace these automated assembly methods by way of the C10 Node (110). In other words, the C10 Node (110) is designed to constantly evolve as automation of labor enters the industry.

Notably, many aspects of a build project or design project require not only manual labor, but also permanent/temporary materials and equipment to support the labor/assembly function. Examples of temporary equipment may include machinery used for demolition and excavation; formwork for pouring concrete; shoring and/or scaffolding material; equipment utilized for earth retention or access to higher portions of a facility; temporary enclosures which are utilized for traffic control or maintaining heated environments within colder working conditions, etc. The temporary materials and equipment are very much associated with the labor requirements of the project and not as clear-cut as a direct, permanent line item. These temporary materials and equipment are thus identified and scheduled by way of the C10 Node (110).

The C10 Node (110), by creating an initial production of assembly labor for the project, is utilized as a comparison resource to the vendor market that shall be bidding and providing firm contractual schedule commitments to the project. The C10 Node (110) then sends its information and evaluated input back to the D20 Node (120) for optimizing the accuracy of the preliminary schedule. The D20C Vendor Schedule Input Node (230) is utilized to also add its more accurate and up-to-date input as it relates to the actual, current capabilities of the vendors in the market that are interested and likely to be involved in the actual assembly of the project.

Vendors who are interested in bidding on the project, or at a minimum willing to provide their input on the duration of their specialty that is involved with the assembly of the project, are provided information concerning the project as it relates to their specialty. The vendor is also provided information that lets the vendor know the desired completion of its specialty item and the completion date of the entire project. The vendor based on its backlog, capability, available resources, understanding of the project, etc. calculates and sends back the schedule duration to which it is willing to commit. The D20C Node (230) then sends its information and evaluated input back to the D20 Node (120) for optimizing the accuracy of the preliminary schedule.

As previously stated, after the D20 Node (120) receives input from the C10 Node (110) and the D20C Node (230), the D20 Node (120) makes adjustments from those more educated and detailed specific nodes C10/D20C (110/230) to optimize the accuracy of the preliminary schedule and sequence of work at that point of the process. The reader will here again note that the D20 Preliminary Schedule and Sequence of Work Node (120) identifies any discrepancies from the information it is receiving from the C10 Node (110 and the D20C Node (230) and manages those discrepancies to make the most accurate preliminary schedule as it relates to the then current market conditions.

Once the foregoing process is complete, the D20 Preliminary Schedule and Sequence of Work Node (120) sends the information downstream to the D21 Review & Adjust Schedule and Sequence of Work Node (121) for the next level of scrutiny prior to the schedule being used and injected into the process in which the actual assembly/construction of the project starts to take place. The primary role of the D21 Review & Adjust Schedule and Sequence of Work Node (121) is to provide the most current updated comprehensive schedule in a format that can be reviewed, as a checks and balance, by a professional human being having experience and understanding of the project.

This node receives the most current and updated schedule from the D20 Node (120) and compares its standard assembly intelligence built into its system to give the general guideline of schedule requirements. It then highlights any discrepancies it finds to help these concerns be brought to the attention of the professional human being doing the review. The reviewer has the ability and the option to go well beyond what the D21 Node (121) highlights or flags. The reviewer has the ability and the option to consider and manually adjust any sequence, activity, or duration to the schedule at that particular time of the process. The D21 Node (121) also considers site logistics, level of difficulty of project, effects of weather from the region, etc.

The schedule produced is easily legible and understood by a construction professional with ordinary level of skill or construction assembly knowledge. The D21 Node (121) is also available to vendors for review and comment on its accuracy which will alert the operator to re-evaluate in the D21 Node (121).

The G81 Establish Project Control Points & GPS Node (181) combines the information from the design and site evaluation in existing conditions provided from the BD5 Node (105) and develops the basic three-dimensional controls that are used throughout the project. The G81 Node (181) is essential for assisting in consideration of all types of site conditions such as existing structures on the site, existing utilities, topographic elevations of the site, water flow and sheeting across the site, locations of existing curbs, paving, and other traffic rights-of-way, etc., in order to complete a proper and accurate schedule for the project. The information provided by the G81 Establish Project Control Points & GPS Node (181) is also utilized in the actual assembly of the project being necessary for the proper placement of each component that is required for the complete assembly of the project.

It is because of the G81 Node (181), along with a few others (discussed below) that track the actual physical status on the projects site, that the secondary role of the AUTOBUILD SCHEDULE system/module can be accomplished. This secondary role of the AUTOBUILD SCHEDULE system/module is to provide schedule monitoring and real-time updating of the schedule for the actual, physical assembly of the project as it is taking place. These schedule updates, and possible required re-sequencing, are utilized by the current human labor assembly crews of the project or within the evolving automation systems, drone capabilities, robotic assemblies, etc., to re-sequence their work plan. This also produces a possible waterfall effect, depending on how big of change, that needs to be communicated with all other activities needing to take place downstream.

The D22 Step-by-Step Piece-by-Piece Build Sequence and Exact Location Node (122) receives and meshes together the most current desired schedule and sequence for the project from the D21 Node (121) and the three-dimensional placement points containing GPS capability from the G81 Node (181) to create a schedule system for the project that can be utilized by parties fabricating and assembling the project in real time. The D22 Node (122) establishes a three-dimensional or 3D control system within which the project is to be built and confirms that the elements of the facility are in the exact spatial location as required.

As the D22 Node (122) manages and oversees the placement of each element within the 3D environment, it is also communicating with the scheduling portions of the system, such as the D23 Node (123) in bi-directional or two-way communication with the D22 Node (122) to confirm elements are being installed in proper sequential order as required. The D22 Node (122) further operates in conjunction with the G82 Node (182) in downflow communication therewith to maintain constant updates as to what the actual conditions are on the project site. If some aspect of the project is amiss, the G82 Node (182) sends out alerts that corrections are required.

The D23 and D24 Nodes as referenced at (123) and (124) respectively, are essentially Project Schedule Update or Review and basic Adjust Schedule Nodes, both of which are in downflow communication with the D22 Node (122). While the D23 Project Schedule Update Node (123) is in direct downflow communication with the D22 Node (122), the D24 Schedule Update Node (124) flows from an onsite surveillance node denoted by the G84 Node (184) otherwise denoted as a Project Video Camera Progress and Security Node (184). The D23 Node (123) and the D24 Node (124) work in a very similar manner by constantly measuring actual build progress and comparing the actual build progress to the planned project schedule.

The reader will note, however, that the D23 Node (123) primarily functions as a preliminary update node or module upstream or in upflow communication with the F52 Node (152) described as a Contractual Commitment and Accountability System Node. The F52 Contractual Commitments and Accountability System Node (152) ensures the correct updated schedule information (best at the time) is implemented in the contracts with the vendors. The D24 Node (124) is placed within the revolving circle of actual on-site progress as updated by the G84 Node (184), and transmits scheduling information to the system governance nodules or brains that are constantly managing the sequence and accuracy of the work as exemplified by the BD5 Node (105), the C10 Node (110), the D23 Node (123), the F52 Node (152), and the G82 Node (182).

The F52 Node is a Contractual Commitment and Accountability System Node at which contract agreements are populated in unilateral communication with the D23 Node (123). The F52 Node (152) essentially confirms in written detail the scope of work to be provided along with performance criteria including schedule requirements as per contractual commitments. At this point there is unilateral communication in order to also allow executives of the vendor's organization supplying materials labor or services to the project to be aware of something being amiss concerning the scheduled progress and allow them to take action that may be in addition to what is actually taking place on the project site. In construction contracting, it is common practice to have terms of communication that may present nonconformance to the construction contract. The communication between the D23 Node (123) and the F52 Node (152) facilitates the legal obligations for notice of noncompliance or default that are typically required by contract.

The G82 Node (182) is a Work in Place Check Off System-Control, Confirmation, Notification, Alarm, and Vendor Response Node or software module component. The G82 Node or software module component is another important element that works closely in conjunction with the D22 Node (122) and the circular system of monitoring the actual work progress on site.

The G82 Node (182) comprises all the required information and data for precisely coordinating and managing all building elements as they are assembled from the standpoint of verifying the products are (a) per specification, (b) positioned in the correct location(s), (c) assembled in the correct sequence, (d) connecting two adjacent products correctly, (e) meeting the project schedule, etc.

When the G82 Node (182) detects a product problem (i.e. when something is amiss or not meeting the contractual requirements) notification(s) and/or alert(s) are sent out to the appropriate parties to make adjustments and corrections. For serious and urgent issues that have a major impact on the project or safety to people and the environment, a more robust alarm will be triggered to better communicate a sense of urgency. The G82 Node (182) utilizes, communicates, and coordinates with other nodes that form the physical monitoring and tracking system of the actual project status or current workflow.

The G83 Node (183) is a Vendor Robot Interceptor & Robot Action Node. The G83 Node operates from either Professional Human Beings or within software-based components that may already be carried or implemented by vendors involved with the project, and through current and future developments of Drone and Robotic abilities. The G83 Node (183) is basically the communication system that informs and directs human laborers, drones, mechanical equipment, and robots to carry out the work required in the appropriate sequence, in the correct location, and at the correct time. The G83 Node (183) further has the capability to communicate back to appropriate nodal functions that are needed for collaboration of physical actions so that on-site work advances properly.

The G84 Node (184) is a Live Video Progress and Security Surveillance Node. The G84 Node (184) coordinates live video through fixed cameras and drones and other sensors that are tied into GPS systems to track progress visually and materially in real-time at the project site. The G84 Node (184) provides the eyes, ears, and fingers to the AUTOBUILD SCHEDULE system/module that functions similarly to a human operator or superintendent in visualizing, inspecting, confirming, even touching and feeling elements of the project to ensure timely compliance with an ability to communication directly or indirectly with other support nodes to keep the circular system flowing toward progress. The G84 Node (184) is preferably further equipped with sensors to detect temperature, moisture, density, etc. so as to help monitor, confirm, and communicate necessary information and data to appropriate peripheral support nodes within the AUTOBUILD SCHEDULE system/module as it pertains to and possibly affects the project schedule.

While the above descriptions contain much specificity, this specificity should not be construed as limitations on the scope of the invention, but rather as an exemplification of the invention. The foregoing specifications are contemplated to essentially provide a scheduling system operable within a construction project management system. The scheduling system is contemplated to preferably comprise, in combination: a series of networked computers, the series of networked computers being in communication with one another and being configured to implement a series of non-transitory, computer-implementable, software-based modular components allowing directional inter-module communication therebetween.

Certain project design, basic schedule constraints, and existing conditions of site software module components initially provide information concerning a design project to be added for enabling the scheduling system to perform its function in providing scheduling required for the design project. A centralized schedule information, conversion and management software module component in downflow communication with the project design, basic schedule constraints, and existing conditions of site software module components.

The centralized schedule information, conversion and management software module component accumulates information received from the project design, basic schedule constraints, and existing conditions of site software module component(s), analyzes the information, labels the information and organizes the information in a manner for enabling and supporting peripheral software module components in networked, inter-module communication with the schedule information, conversion and management software module component to perform peripheral software module component functions.

At least one downstream software module component receives data from the centralized schedule information, conversion and management software module component and is configured to provide an initial schedule template for all project elements placing all project elements into a preliminary sequence for review and adjustment by peripheral downstream software module components. The initial schedule template is communicated downstream to a labor and assembly production and equipment needs software module component from a preliminary schedule and sequence of work software module component. The labor and assembly production and equipment needs software module component is in bidirectional communication with the preliminary schedule and sequence of work software module component.

The scheduling system may further preferably comprise a vendor schedule input software module component. The vendor schedule input software module component is in bidirectional communication with the preliminary schedule and sequence of work software module component. The preliminary schedule and sequence of work software module component receives input from both the vendor schedule input software module component and the labor and assembly production and equipment needs software module component for adjusting and optimizing accuracy of a preliminary schedule based on the initial schedule template.

The scheduling system may further preferably comprise a review and adjust schedule and sequence of work software module component. The preliminary schedule is sent to the review and adjust schedule and sequence of work software module component in downflow communication with the preliminary schedule and sequence of work software module component. The review and adjust schedule and sequence of work software module component prepares the preliminary schedule and injects a finally prepared schedule into the process.

The scheduling system may further preferably comprise an establish project control points and GPS software module component. The establish project control points and GPS software module component is in unidirectional downflow communication from the centralized schedule information, conversion and management software module component. The establish project control points and GPS software module component combines information received from the centralized schedule information, conversion and management software module component and develops basic three-dimensional controls for use throughout the construction project.

The scheduling system may further preferably comprise a step-by-step piece-by-piece build sequence and exact location software module component. The step-by-step piece-by-piece build sequence and exact location software module component receives the schedule and sequence data from the review and three-dimensional placement points containing GPS capability data from the adjust schedule and sequence of work software module component to create a schedule system for the project that can be utilized by parties fabricating and assembling the project in real time.

The scheduling system may further preferably comprise at least one schedule update software module component in downflow communication from the step-by-step piece-by-piece build sequence and exact location software module component. A project schedule update software module component measures actual build progress and compares the actual build progress to final project schedule. The project schedule update software module component is in bidirectional communication with a contractual commitment and accountability software module component. The project schedule update software module component communicates with the contractual commitment and accountability software module component for facilitating legal obligations for notice of noncompliance.

The scheduling system may further preferably comprise a basic schedule update software module component. The basic schedule update software module component also measures actual build progress and compares the actual build progress to the final project schedule and is in unidirectional downflow communication from a live video progress and security surveillance software module component. The live video progress and security surveillance software module component continuously updates the basic schedule update software module component with actual on-site progress data.

The scheduling system may further preferably comprise a work in place check off system-control, confirmation, notification, alarm, and vendor response software module component. The work in place check off system-control, confirmation, notification, alarm, and vendor response software module component is in unidirectional downflow communication from both the step-by-step piece-by-piece build sequence and exact location software module component and the project schedule update software module component for coordinating and managing all building elements as they are assembled from the standpoint of verifying the products are per specification, positioned in the correct location(s), assembled in the correct sequence, two adjacent products are connected correctly, and the final project schedule is being met.

The scheduling system may further preferably comprise a vendor robot interceptor and robot action software module component. The vendor robot interceptor and robot action software module component is in unidirectional downflow communication from the work in place check off system-control, confirmation, notification, alarm, and vendor response software module component and in unidirectional upflow communication to the live video progress and security surveillance software module component. The vendor robot interceptor and robot action software module component provides a communication system that informs and directs human laborers, drones, mechanical equipment, and robots to carry out the work required in the appropriate sequence, in the correct location, and at the correct time.

Accordingly, although the scheduling system according to the present invention has been described by reference to a number of different features and aspects, it is not intended that the novel descriptions and systemic interactions thereof be limited thereby, but that modifications thereof are intended to be included as falling within the broad scope and spirit of the foregoing disclosure, the appended drawings, and the following claims.

What is claimed is:

1. A scheduling system comprising, in combination:
   a plurality of networked computers being in communication with one another and configured to implement a plurality of non-transitory, computer-implementable, software-based components allowing inter-component communication therebetween;
   a project design, basic schedule constraints, and existing conditions of site software component configured to provide information concerning a project design for enabling the scheduling system to perform its function in providing scheduling required for an automated construction of a project from the project design;
   a centralized schedule information, conversion and management software component in communication with the project design, basic schedule constraints, and existing conditions of site software component configured to:
   accumulate said information received from the project design, basic schedule constraints, and existing conditions of site software component;
   convert said information into a standardized data format that enables peripheral software components in networked, inter-component communication with the centralized schedule information, conversion and management software component to perform automated peripheral software component functions;
   label, and organize said information in a manner for enabling and supporting peripheral software components in networked, inter-component communication with the schedule information, conversion and management software component to perform peripheral software component functions; and
   send said information as labeled and organized to at least one downstream software component configured to:
   receive said information from the centralized schedule information, conversion and management software component; and
   provide an initial schedule template for all project elements placing all project elements into a preliminary sequence for review and adjustment by peripheral downstream software components.

2. The scheduling system of claim 1 wherein the initial schedule template is communicated downstream to a labor and assembly production and equipment needs software component from a preliminary schedule and sequence of work software component.

3. The scheduling system of claim 2 comprising a vendor schedule input software component, the vendor schedule input software component being in communication with the preliminary schedule and sequence of work software component, the preliminary schedule and sequence of work software component receiving input from both the vendor schedule input software component and the labor and assembly production and equipment needs software component for adjusting and optimizing accuracy of a preliminary schedule based on the initial schedule template.

4. The scheduling system of claim 3 comprising a review and adjust schedule and sequence of work software component, the preliminary schedule being sent to the review and adjust schedule and sequence of work software component in communication with the preliminary schedule and sequence of work software component, the review and adjust schedule and sequence of work software component being configured to prepare the preliminary schedule and inject a finally prepared schedule into the process.

5. The scheduling system of claim 4 comprising an establish project control points and GPS software component, the establish project control points and GPS software component being in communication with the centralized schedule information, conversion and management software component and configured to combine information received from the centralized schedule information, conversion and management software component and develop basic three-dimensional controls for use throughout the construction of the project from the project design.

6. The scheduling system of claim 5 comprising a step-by-step piece-by-piece build sequence and exact location software component, the step-by-step piece-by-piece build sequence and exact location software component receiving (a) schedule and sequence data from the review and adjust schedule and sequence of work software component and (b) three-dimensional placement points containing GPS capability data from the establish project control points and GPS software component to create a schedule system for the project that can be utilized by parties fabricating and assembling the project in real time.

7. The scheduling system of claim 6 comprising at least one project schedule update software component, the at least one project schedule update software component being in communication with the step-by-step piece-by-piece build sequence and exact location software component.

8. The scheduling system of claim 7 wherein the at least one project schedule update software component measures actual build progress and compares the actual build progress to the finally prepared schedule, the at least one project schedule update software component being in communication with a contractual commitment and accountability software component, the at least one project schedule update software component communicating with the contractual commitment and accountability software component for facilitating legal obligations for notice of noncompliance.

9. The scheduling system of claim 7 wherein the at least one project schedule update software component comprises a basic schedule update software component, the basic schedule update software component being in communication with a live video progress and security surveillance software component, the live video progress and security surveillance software component being configured to continuously update the at least one project schedule update software component with actual on-site progress data.

10. The scheduling system of claim 9 comprising a vendor robot interceptor and robot action software component, the vendor robot interceptor and robot action software component being in communication with the work in place check off system-control, confirmation, notification, alarm, and vendor response software component and the live video progress and security surveillance software component, the vendor robot interceptor and robot action software component providing a communication system that informs and directs human laborers, drones, mechanical equipment, and robots to carry out the work required in an appropriate sequence, in a correct location, and at a correct time.

11. The scheduling system of claim 7 comprising a work in place check off system-control, confirmation, notification, alarm, and vendor response software component, the work in place check off system-control, confirmation, notification, alarm, and vendor response software component being in communication with both the step-by-step piece-by-piece build sequence and exact location software component and the at least one schedule update software component for coordinating and managing all building elements as they are assembled from the standpoint of verifying the building elements are per specification, positioned in correct location(s), assembled in correct sequence, two adjacent products are connected correctly, and the finally prepared schedule is being met.

12. The scheduling system of claim 1 wherein the centralized schedule information, conversion and management software component is configured to analyze said information for errors to properly enable and support downstream automation processes to support the complete construction of the project design in an automated manner and alert a user if corrections are required for ensuring said information supports the project design and the complete construction thereof.

13. A scheduling system operable within a computer network environment comprising:
at least one computer for implementing non-transitory, computer-implementable, software-based components; and
a plurality of non-transitory, computer-implementable, software-based components comprising:
a project design, basic schedule constraints, and existing conditions of site software component configured to provide information concerning a project design for enabling the scheduling system to perform its function in providing scheduling required for an automated construction of a project from the project design;
a centralized schedule information, conversion and management software component in communication with the project design, basic schedule constraints, and existing conditions of site software component configured to:
accumulate said information received from the project design, basic schedule constraints, and existing conditions of site software component;
convert said information into a standardized data format that enables peripheral software components in networked, inter-component communication with the centralized schedule information, conversion and management software component to perform automated peripheral software component functions;
label and organize said information in a manner for enabling and supporting peripheral software components in networked, inter-component communication with the schedule information, conversion and management software component to perform peripheral software component functions;
send said information as labeled and organized to at least one downstream software component configured to:
receive said information from the centralized schedule information, conversion and management software component; and
provide an initial schedule template for all project elements placing all project elements into a preliminary sequence for review and adjustment by peripheral downstream software components.

14. The scheduling system of claim 13 wherein the initial schedule template is communicated downstream to a labor and assembly production and equipment needs software component from a preliminary schedule and sequence of work software component.

15. The scheduling system of claim 14 comprising a vendor schedule input software component, the vendor schedule input software component being in communication with the preliminary schedule and sequence of work software component, the preliminary schedule and sequence of work software component receiving input from both the vendor schedule input software component and the labor and assembly production and equipment needs software component for adjusting and optimizing accuracy of a preliminary schedule based on the initial schedule template.

16. The scheduling system of claim 15 comprising a review and adjust schedule and sequence of work software component, the preliminary schedule being sent to the review and adjust schedule and sequence of work software component in communication with the preliminary schedule and sequence of work software component, the review and adjust schedule and sequence of work software component being configured to prepare the preliminary schedule and inject a finally prepared schedule into the process.

17. The scheduling system of claim 16 comprising an establish project control points and GPS software component, the establish project control points and GPS software component being in communication with the centralized schedule information, conversion and management software component, the establish project control points and GPS software component being configured to combine said information received from the centralized schedule information, conversion and management software component and develop basic three-dimensional controls for use throughout the construction of the project.

18. The scheduling system of claim 17 comprising a step-by-step piece-by-piece build sequence and exact location software component configured to receive (a) schedule and sequence data from the review and adjust schedule and sequence of work software component and (b) three-dimensional placement points containing GPS capability data from the establish project control points and GPS software component to create a schedule system for the project that can be utilized by parties fabricating and assembling the project in real time.

19. The scheduling system of claim 18 comprising a project schedule update software component configured to measure actual build progress and compare the actual build progress to the finally prepared schedule, the project schedule update software component being in communication with a contractual commitment and accountability software component, the project schedule update software component communicating with the contractual commitment and accountability software component for facilitating legal obligations for notice of noncompliance.

20. The scheduling system of claim 19 comprising a work in place check off system-control, confirmation, notification, alarm, and vendor response software component, the work in place check off system-control, confirmation, notification, alarm, and vendor response software component being in communication with both the step-by-step piece-by-piece build sequence and exact location software component and the project schedule update software component for coordinating and managing all building elements as they are assembled from the standpoint of verifying the building elements are per specification, positioned in correct location (s), assembled in correct sequence, two adjacent products are connected correctly, and the finally prepared schedule is being met.

21. The scheduling system of claim 20 comprising a vendor robot interceptor and robot action software component, the vendor robot interceptor and robot action software component being in communication with the work in place check off system-control, confirmation, notification, alarm, and vendor response software component and in communication with the live video progress and security surveillance software component, the vendor robot interceptor and robot action software component being configured to provide a communication system that informs and directs human laborers, drones, mechanical equipment, and robots to carry out the work required in an appropriate sequence, in a correct location, and at a correct time.

22. The scheduling system of claim 13 wherein the centralized schedule information, conversion and management software component is configured to analyze said information for errors to properly enable and support downstream automation processes to support a complete construction of the project design in an automated manner and alert a user if corrections are required for ensuring said information supports the project design and the complete construction thereof.

* * * * *